United States Patent
Weinert, Jr. et al.

(10) Patent No.: US 12,445,443 B2
(45) Date of Patent: *Oct. 14, 2025

(54) SECURELY COMMUNICATING DATA BETWEEN AN APPLICATION ASSOCIATED WITH AN ENTITY AND A THIRD-PARTY SYSTEM

(71) Applicant: Atomic FI, Inc., Cottonwood Heights, UT (US)

(72) Inventors: Scott Nielsen Weinert, Jr., Spokane, WA (US); Sean Michael Hill, Mesa, AZ (US); Michael Contreras, Reno, NV (US)

(73) Assignee: Atomic FI, Inc., Cottonwood Heights, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/936,749

(22) Filed: Nov. 4, 2024

(65) Prior Publication Data

US 2025/0063044 A1 Feb. 20, 2025

Related U.S. Application Data

(63) Continuation of application No. 18/812,848, filed on Aug. 22, 2024, which is a continuation of application
(Continued)

(51) Int. Cl.
*G06Q 20/08* (2012.01)
*G06Q 20/40* (2012.01)
*H04L 9/40* (2022.01)

(52) U.S. Cl.
CPC ........ *H04L 63/0884* (2013.01); *H04L 63/083* (2013.01); *G06Q 20/08* (2013.01);
(Continued)

(58) Field of Classification Search
CPC ... H04L 63/00; H04L 63/083; H04L 63/0884; G06Q 20/08; G06Q 20/0855; G06Q 20/40

See application file for complete search history.

(56) References Cited

U.S. PATENT DOCUMENTS 9,842,322 B2 * 12/2017 Johnston ................ G06Q 20/42
11,615,234 B2 * 3/2023 Grosse .................. G06F 40/174
704/9

(Continued)

OTHER PUBLICATIONS

"The Difference Between a Third-Party Sender and a Third-Party Service Provider"—Rachel Pike, Modern Treasury, May 27, 2020 https://www.moderntreasury.com/journal/the-difference-between-a-third-party-sender-and-a-third-party-service-provider-in-payments (Year: 2020).*
(Continued)

Primary Examiner — Randy A Scott
(74) Attorney, Agent, or Firm — Van Pelt, Yi & James LLP (57) ABSTRACT

A webview associated with a third-party system is provided in an application context associated with an entity. It is determined that a user has been authenticated by the third-party system based on data comprising a page displayed via the provided webview. In response to a determination that the user has been authenticated by the third-party system, one or more tasks to perform a function with the third-party system on behalf of the entity are automated.

20 Claims, 10 Drawing Sheets

Related U.S. Application Data

No. 18/531,578, filed on Dec. 6, 2023, now Pat. No. 12,120,118.

(60) Provisional application No. 63/434,824, filed on Dec. 22, 2022.

(52) U.S. Cl.
CPC ......... *G06Q 20/0855* (2013.01); *G06Q 20/40* (2013.01); *H04L 63/00* (2013.01)

(56) References Cited

U.S. PATENT DOCUMENTS

| | | | | |
|---|---|---|---|---|
| 2015/0134520 A1* | 5/2015 | Martin | ................... | G06Q 20/02 705/42 |
| 2019/0163896 A1* | 5/2019 | Balaraman | ............ | H04L 9/3226 |
| 2023/0043318 A1* | 2/2023 | Selman | ............... | G06F 21/6209 |

OTHER PUBLICATIONS

"Set Up Direct Deposit to Work with a Third-Party Program"—Sage Group, Oct. 2018 https://help-sage100.na.sage.com/2022/Subsystems/PR/PRSetupProced/Set_Up_Direct_Deposit_to_Work_with_Third-Party_Program.htm (Year: 2018).*

Rachel Pike. The Difference Between a Third-Party Sender and a Third-Party Service Provider. Modern Treasury: https://www.moderntreasury.com/journal/the-difference-between-a-third-party-sender-and-a-third-party-service-provider-in-payments. May 27, 2020.

Set Up Direct Deposit to Work with a Third-Party Program. Sage Group/Sage 100/2018 https://helpsage100.na.sage.com/2018/Subsystems/PR/PRSetupProced/Set_Up_Direct_Deposit_to_Work_with_Third-Party_Program.htm. 2018.

* cited by examiner

SECURELY COMMUNICATING DATA BETWEEN AN APPLICATION ASSOCIATED WITH AN ENTITY AND A THIRD-PARTY SYSTEM

CROSS REFERENCE TO OTHER APPLICATIONS

This application is a continuation of U.S. patent application Ser. No. 18/812,848 entitled SECURELY COMMUNICATING DATA BETWEEN AN APPLICATION ASSOCIATED WITH AN ENTITY AND A THIRD-PARTY SYSTEM filed Aug. 22, 2024, which is a continuation of U.S. patent application Ser. No. 18/531,578 entitled SECURELY COMMUNICATING DATA BETWEEN AN APPLICATION ASSOCIATED WITH AN ENTITY AND A THIRD-PARTY SYSTEM filed Dec. 6, 2023, which claims priority to U.S. Provisional Patent Application No. 63/434,824 entitled SECURELY COMMUNICATING DATA BETWEEN AN APPLICATION ASSOCIATED WITH AN ENTITY AND A BUSINESS SYSTEM filed Dec. 22, 2022, each of which is incorporated herein by reference for all purposes.

BACKGROUND OF THE INVENTION

An employer may utilize a third-party system, such as a payroll provider or other employment-related third-party system, to perform tasks, such as to initiate the deposit of wages associated with a user (e.g., employee, independent contractor) to an account maintained by an entity associated with the user (e.g., a financial institution, a financial technology company, a financial service organization, a benefit provider, an institution, an enterprise, a government, a business, a corporation, etc.), to maintain and provide access to employment, income, tax, payroll, or other employment-related business records, etc.

In a prior approach, the user may utilize a third-party application, which the user accesses through an integration with an application, such as an application associated with an entity, to connect the user's payroll provider to the entity and/or alter settings in the payroll that indicate how the user would like their wages to be dispersed. The user provides their login credentials associated with the payroll provider to the application, which then provides the login credentials associated with the payroll provider to an intermediary service. The intermediary service utilizes the login credentials associated with the payroll provider to establish a communication session between the payroll provider and a device associated with the user on which the application is installed. In such an approach, the user's login credentials associated with the payroll provider are vulnerable because the intermediary service may be compromised at a later point in time at which the login credentials may be exposed to one or more malicious actors. A malicious actor may divert the user's earnings to a different entity after acquiring the user's login credentials associated with the payroll provider.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to securely communicate data between an application associated with an entity and a third-party system is disclosed. Examples of an entity include, without limitation, a bank or other financial institution, a financial technology company, a financial service organization, a benefits provider, an institution, an enterprise, a government, a business, a corporation, etc. Examples of a third-party system include a computing device(s) (e.g., one or more servers, one or more cloud computing services, one or more virtual machines, one or more containers, etc.) associated with a payroll provider, human resources, accounting, billing, ticketing, customer relationship management, applicant tracking, insurance, legal, job recruiting, medical provider, or any other third-party system that has an associated login page or authentication portal. In various embodiments, the members of a group with access to the user's login credentials associated with the third-party system are restricted. For example, the user's login credentials associated with the third-party system may be restricted to the user, the application associated with the entity, and the third-party system (e.g., a payroll provider). Using the disclosed technique, in various embodiments, the requirement to provide login credentials to an intermediary service for the purposes of controlling how the user's wages are dispersed, for example, or to perform any other operation, is removed. As a result, the user's login credentials associated with the payroll provider or other third party system and/or service are more secure because there is one fewer access point from which a malicious actor may obtain the user's login credential associated with the payroll provider.

Furthermore, in the prior approach, a malicious actor may compromise the intermediary service to gain access to the credentials associated with many users. When the disclosed technique is implemented, a malicious actor would need to individually compromise each device associated with a plurality of users to obtain the same number of credentials as under the prior approach. Thus, the disclosed technique reduces the ability of malicious actors to obtain en masse login credentials associated with a plurality of users.

Lastly, removing the need to provide login credentials to the intermediary service removes friction associated with logging into a third-party system because the user is utilizing their own device. After an initial login, the third-party system may recognize the user's device based on the device's IP address or other information associated with the user's device, and not require the user's device to provide additional information, such as a code. In contrast, the intermediary service may be a virtual device running inside of a cloud environment. Each time the user attempts to login, the virtual device associated with the intermediary service appears as a new device to the third-party system because the intermediary service is likely to use different virtual devices for each login. As a result, under the prior approach, the third-party system may require the user to authenticate their device using multi-factor authentication each time they want to log into the third-party system.

Figure 1:
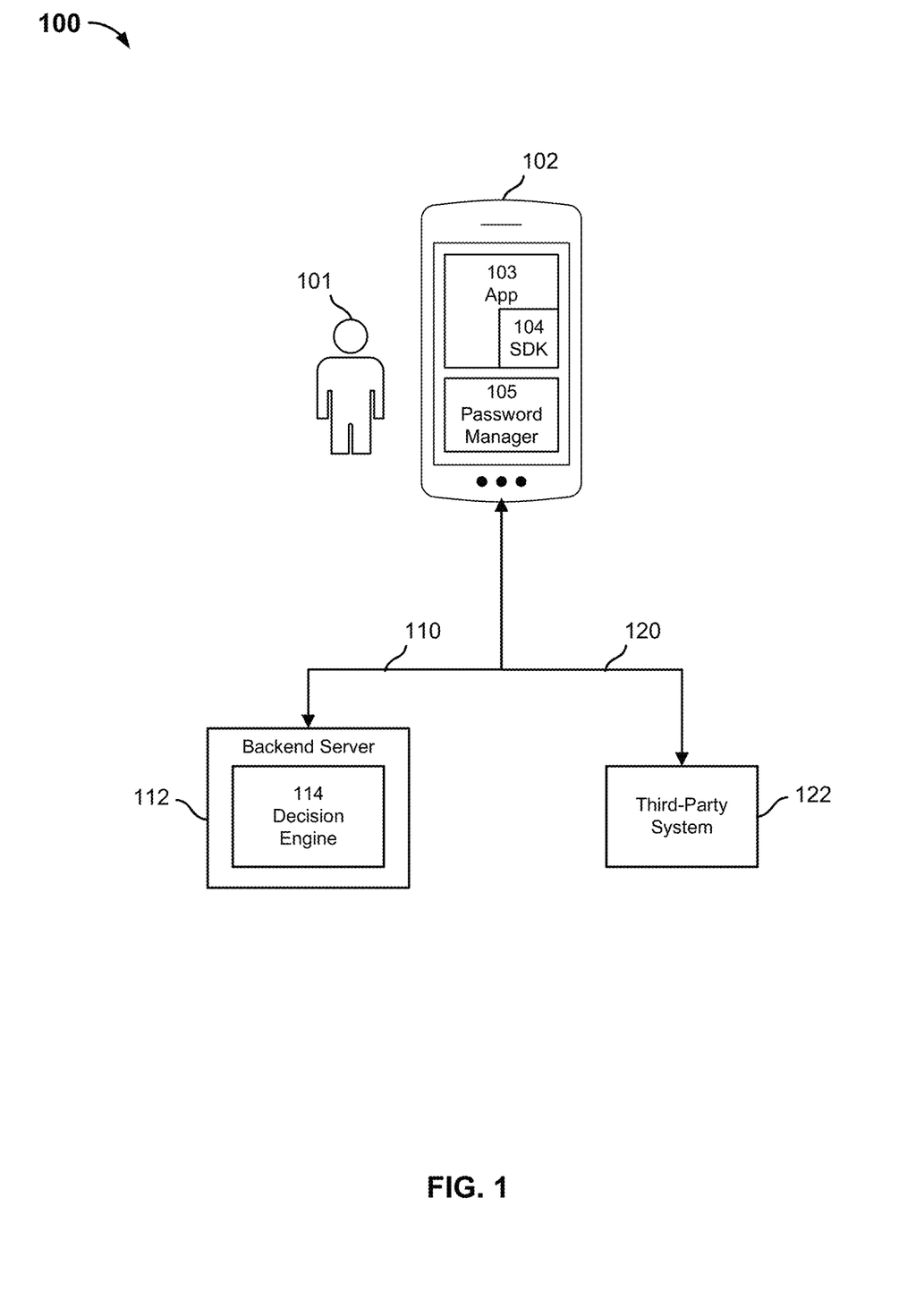
FIG. 1 is a block diagram illustrating an embodiment of a system to securely communicate data between an application associated with an entity and a third-party system.

FIG. 1 is a block diagram illustrating an embodiment of a system to securely communicate data between an application associated with an entity and a third-party system. In the example shown, user 101 is associated with user device 102 (e.g., mobile device, cell phone, smart phone, tablet, laptop, desktop, server, smart watch, IoT device, etc.). An application associated with an entity 103 is installed on user device 102. Application 103 includes software development kit (SDK) (or other code) 104 that enables application 103 to securely communicate data between application 103 and third-party system 122 (e.g., a server) via communication channel 120. SDK 104 is code that is embedded in the code associated with application 103. This may prevent a malicious actor from modifying or viewing the code associated with SDK 104. In some embodiments, user device 102 includes a browser that is configured to securely communicate data to third-party system 122 via communication channel 120. Communication channel 120 may be a wired or wireless communications channel. Data may be communicated over communication channel 120 using the Internet, cellular, Wi-Fi, or any other communication protocol.

Figure 3:
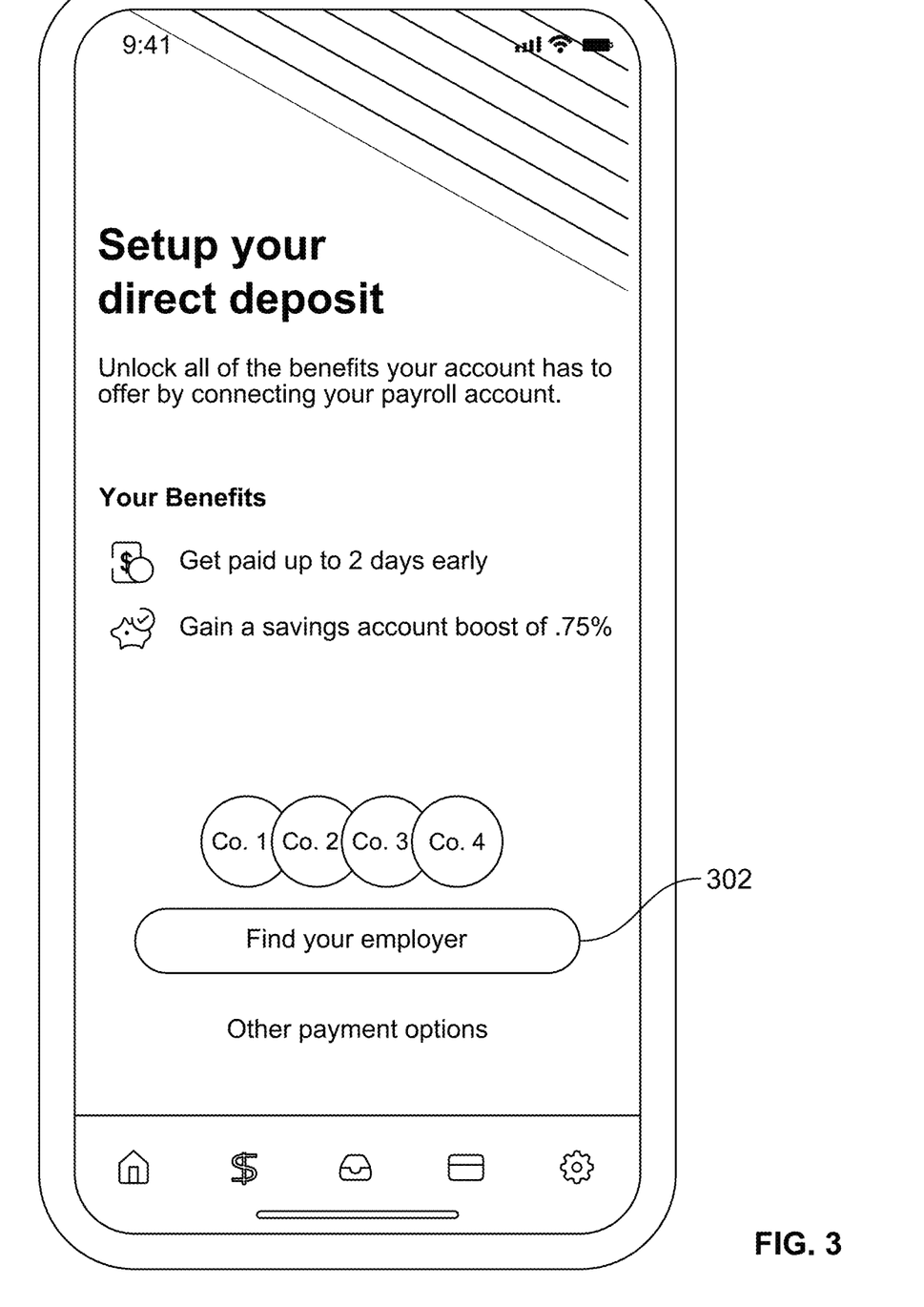
FIG. 3 is an example of a user interface provided by an application in accordance with some embodiments.

User 101 logs into application 103. Application 103 is configured to provide a user interface in which user 101 may request a function to be performed. Examples of a function include, but are not limited to, establishing direct deposit, changing a direct deposit, establishing a recurring payment, managing a recurring payment, applying for a mortgage, applying for a loan, applying for a job, filing an insurance claim, purchasing a product or service, signing a document, or any other function the requires a user to be authenticated before the function is performed. FIG. 3 depicts an example of a user interface provided by an application, such as application 103. In the example shown, the user interface provides the functionality to enable user 101 to establish direct deposit between an employer to an entity associated with application 103.

Figure 4:
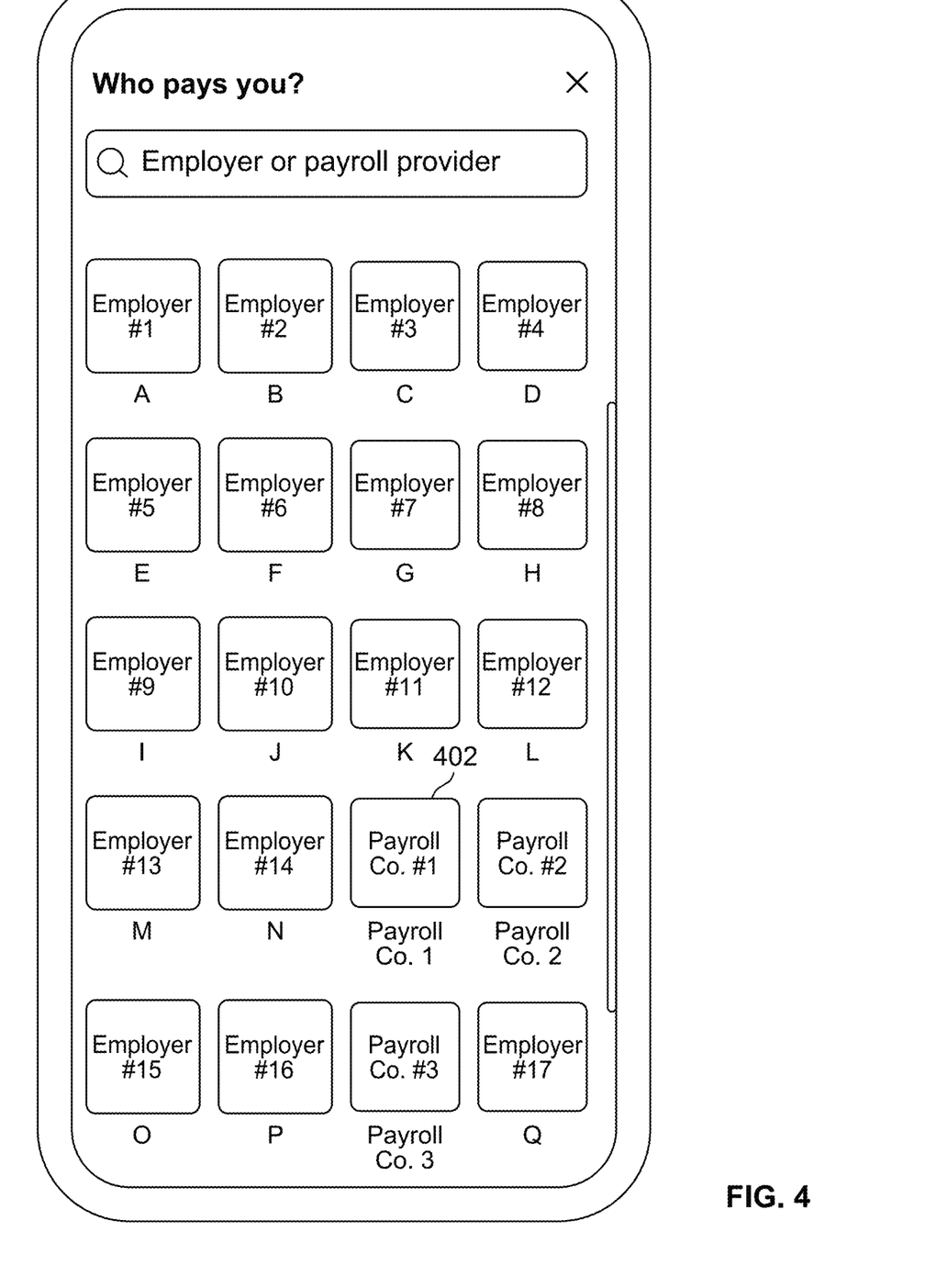
FIG. 4 is an example of a user interface displaying a plurality of third-party systems in accordance with some embodiments.

Application 103 is configured to receive a request to perform a function. For example, user 101 may select user interface item 302. In response to receiving a selection of a user interface item, application 103 is configured to invoke code associated with SDK 104. SDK 104 provides a user interface displaying a plurality of options for different third-party systems. FIG. 4 illustrates a plurality of third-party systems associated with a plurality of employers and a plurality of payroll providers, each of which may cause wages to be deposited to the entity associated with user 101.

Figure 5:
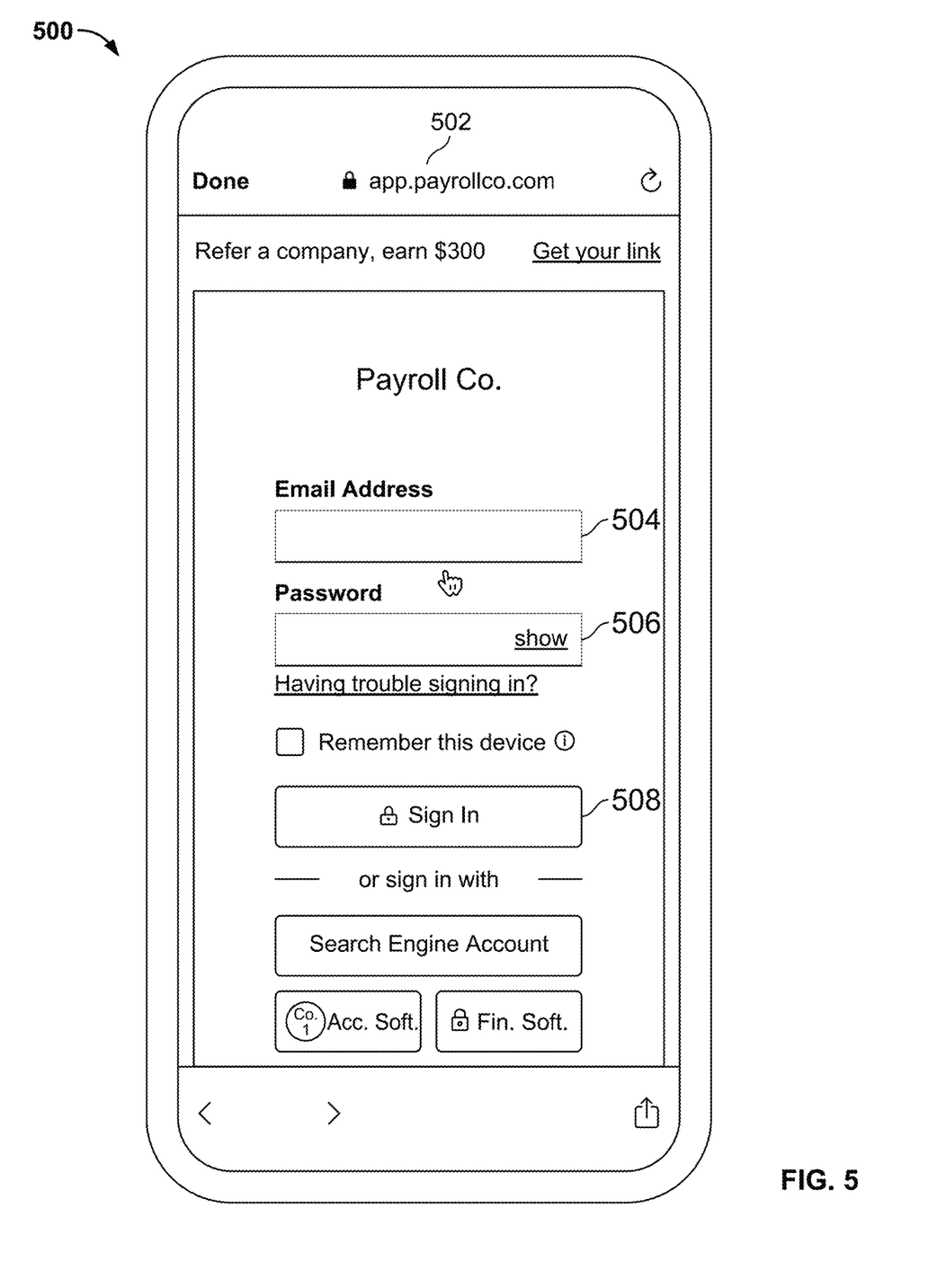
FIG. 5 is an example of a user interface displaying a webview of a native login page associated with a selected third-party system in accordance with some embodiments.

The user interface provided by SDK 104 is configured to receive from user 101 a selection 402 of a third-party system ("Payroll Co.") from a plurality of third-party systems. In response to the selection, application 103 is configured to utilize SDK 104 to obtain and provide a webview of a native login page associated with the selected third-party system. Providing a webview of the native login page associated with the selected third-party system removes the need to provide the user's login credentials to an intermediary service because the user's login credentials are directly provided from application 103, via the webview, to third-party system 122. The user's login credentials are more secure because there is one less access point from which a malicious actor may obtain the user's login credentials. An example of the webview of the native login page associated with the selected payroll provider is depicted in FIG. 5.

In some embodiments, user 101 may enter their login credentials into the webview of the native login page via password manager 105. This reduces the amount of time needed to log into third-party system 122 and increases the likelihood that the entered login credentials are correct. Other systems may display a login page that looks like a native login page associated with third-party system 122 (e.g., a mock login page). However, this poses a problem because password manager 105 is configured to inspect the domain associated with the displayed login page. Password manager 105 may not be able to accurately determine which credentials, if any, to enter into a mock login page that looks like a native login page associated with third-party system 122 because the domain associated with the mock login page that looks like the native login page associated with a third-party system does not match the domain associated with the third-party system. In various embodiments, providing a native webview of a login page associated with third-party system 122, as disclosed herein, enables password manager 105 to correctly enter the login credentials on behalf of user 101.

Other systems may implement an intermediary service that uses a virtual device running inside of a cloud environment to display the mock login page that looks like a native login page associated with third-party system 122. This requires third-party system 122 to communicate with the virtual device, which then communicates with application 103. Embedding SDK 104 within application 103 removes the need for the virtual device to communicate with third-party system 122 and thus reduces the latency associated with communications between application 103 and third-party system 122.

Figure 6:
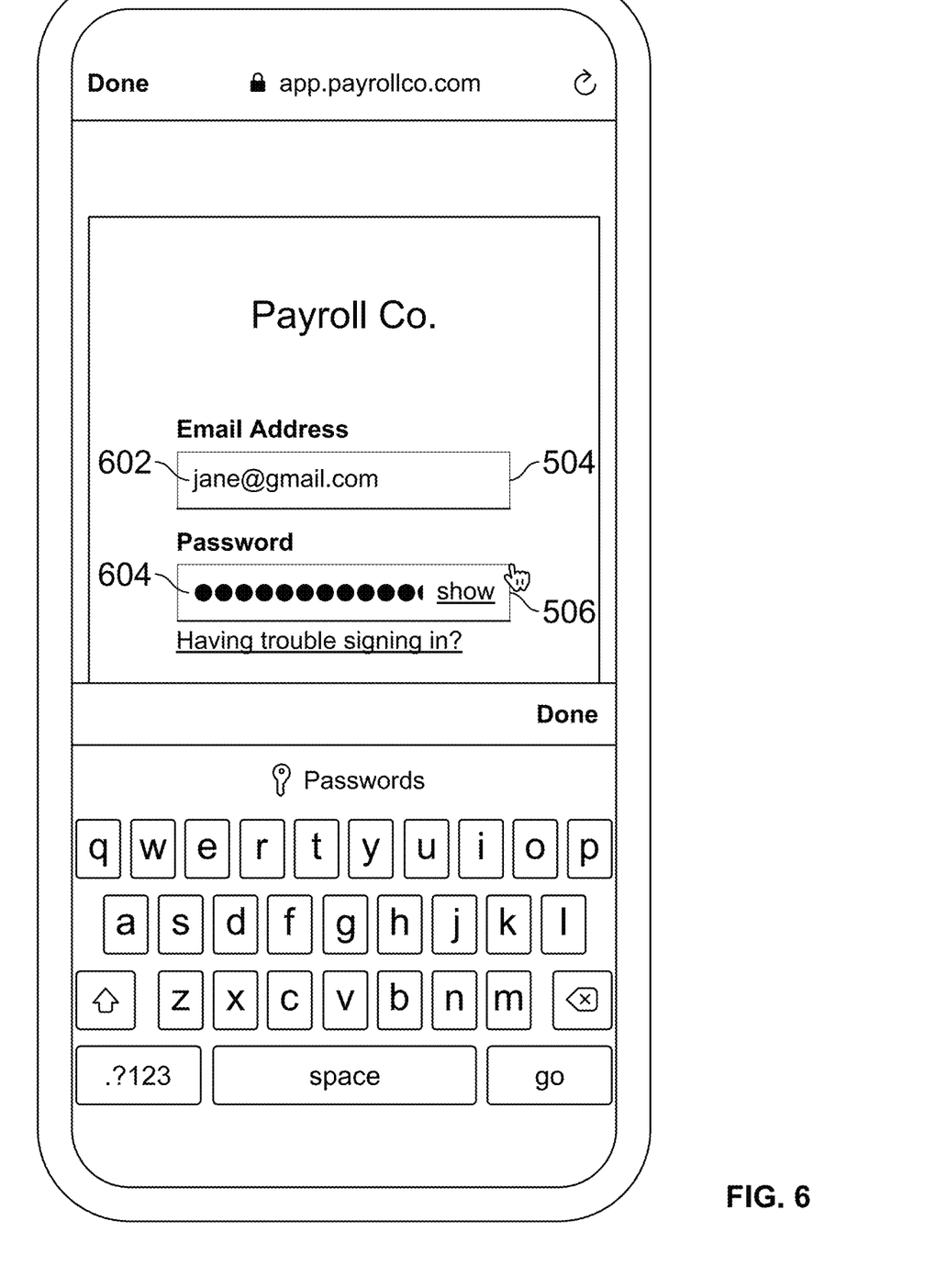
FIG. 6 is an example of a user interface displaying a webview of a native login page associated with a selected third-party system in accordance with some embodiments.

In various embodiments, SDK 104 or an associated entity on or off mobile device 102 is configured to inspect a document object model (DOM) associated with the native login page or other page associated with the selected third-party system. SDK 104 or the associated entity is configured to use one or both of the visual elements associated with a page and a uniform resource locator (URL) associated with the page 502 to determine a state of the user's interaction with the third-party system 122. For example, webview 500 may include an email address object 504 and a password object 506. As seen in FIG. 6, user 101 has entered an email address 602 into the email address object 504 and a password 604 into the password object 506. User 101 may subsequently select the sign-in object 508. The selection of sign-in object 508 is a user interface event that causes the email address 602 and password 604 to be transmitted to third-party system 122 (e.g., a system associated with the selected payroll provider). As a result, the user's login credentials associated with the selected third-party system remain protected from third-party platforms or applications. The user interface event also causes the webview 500 of the native login page associated with the selected third-party system to change from a foreground view associated with application 103 to a background view associated with application 103.

Figure 7:
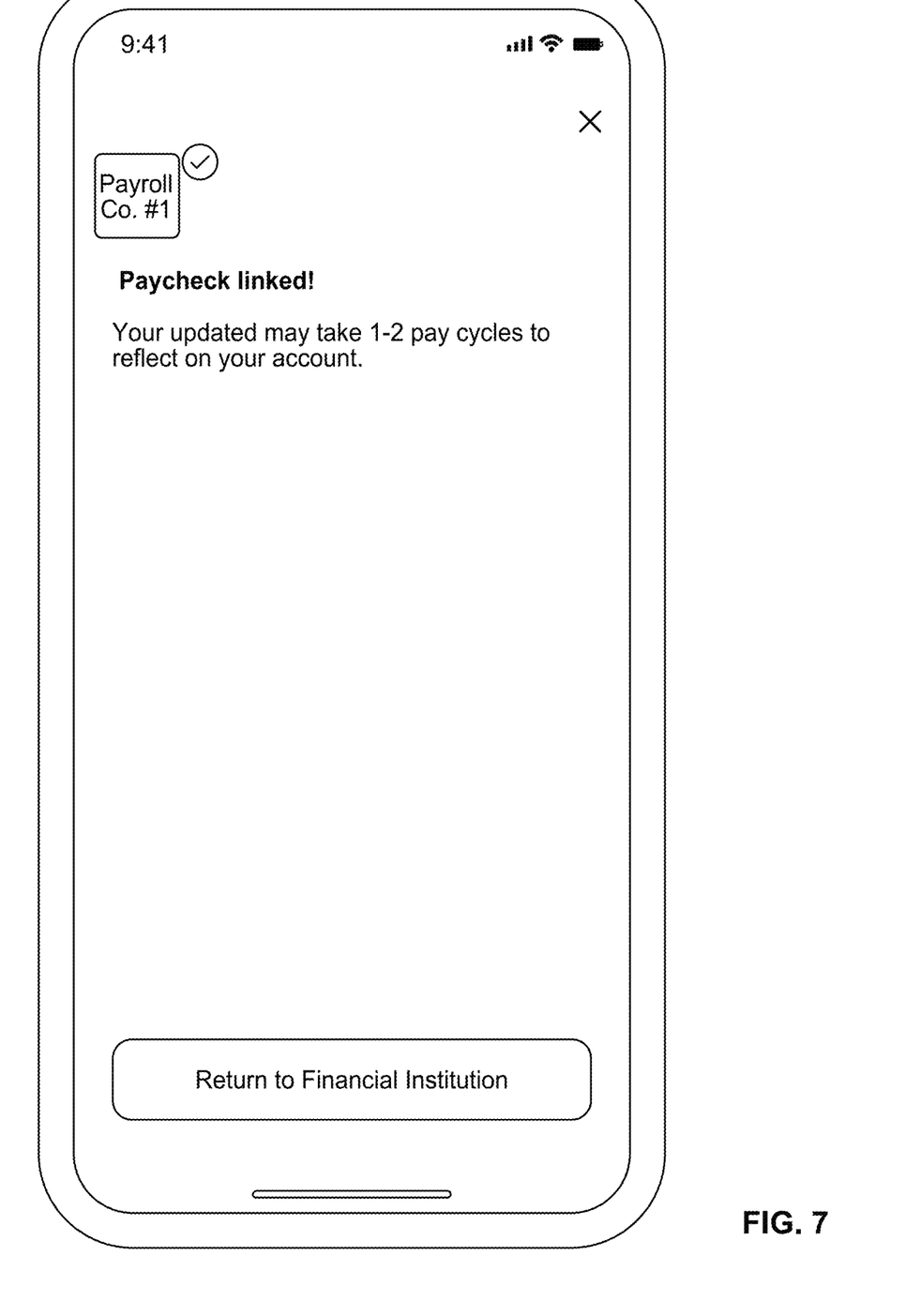
FIG. 7 is an example of a user interface displaying visual elements in a response page in accordance with some embodiments.

Third-party system 122 (e.g., the system associated with the selected payroll provider) determines whether the email address 602 and password 604 are a valid combination. In response to a determination that the entered email address 602 and password 604 are a valid combination, third-party system 122 is configured to provide application 103 an updated webview that indicates user 101 has been authenticated with third-party system 122. In the example shown in FIG. 7, the updated webview indicates that a paycheck associated with user 101 has been linked to the entity (e.g., financial institution). Third-party system 122 may also provide a token or other cookie that indicates user 101 has been authenticated with third-party system 122. The token is stored by user device 102.

After user 101 is authenticated, application 103 may utilize SDK 104 to send to third-party system 122 one or more application programming interface (API) requests corresponding to one or more tasks to perform a function. For example, user 101 may modify an amount associated with a direct deposit to be deposited into a financial account, modify a percentage associated with a direct deposit to be deposited into the account, etc. In another example, user 101 may be completing a loan application via the entity's application 103 and may use techniques disclosed herein to obtain from the payroll provider and provide to the application 103 payroll statements, IRS Forms W-2, or other income verification data.

The webview associated with application 103 natively attaches the token or other cookie (e.g., comprising a cookie and/or an authenticated session identifier contained in a cookie) to each API request, thus providing third-party system 122 an indication that the API request is a trusted request because the token has been previously signed and authenticated by third-party system 122. For example, the webview associated with application 103 may obtain the token and attach it to a Fetch API request.

SDK 104 is configured to analyze the DOM associated with the webview to determine a current state of the webview. Based on the analysis, SDK 104 is configured to determine that user 101 has been authenticated with third-party system 122. For example, SDK 104 may analyze the webview and determine that there is a "sign out" or other visual text on the page (e.g. "paycheck linked" in FIG. 7), which indicates that user 101 has been authenticated. SDK 104 may analyze a URL associated with the webview to determine that user 101 has not been authenticated because the URL (e.g., company.com/login) indicates that user 101 has not been authenticated. In some embodiments, SDK 104 is configured to implement machine learning to determine that user 101 has been authenticated with third-party system 122.

In response to a determination that user 101 has been authenticated, in various embodiments, SDK 104 is configured to automate one or more tasks needed to perform the requested function. In some embodiments, the requested function is performed by providing one or more pre-populated forms to third-party system 122. Information included in the one or more pre-populated forms may be provided by application 103. Examples of information provided by application 103 include, without limitation, name, address, account number, routing number, social security number, birthdate, phone number, email address, or any other information that is subject to typographical errors. Pre-populating the forms with information from application 103 reduces the amount of time associated with performing the requested function because the typographical errors that may delay an approval process associated with performing the requested function have been eliminated. It also prevents user 101 from intentionally providing incorrect information (e.g., information intentionally inflating the value of their assets) to third-party system 122. For example, user 101 may attempt to obtain a loan from a mortgage company. The mortgage company needs the user's banking statements to approve the loan. User 101 may utilize application 103, which is associated with their financial institution, to provide account information securely and accurately to the mortgage company via SDK 104.

Figure 8:
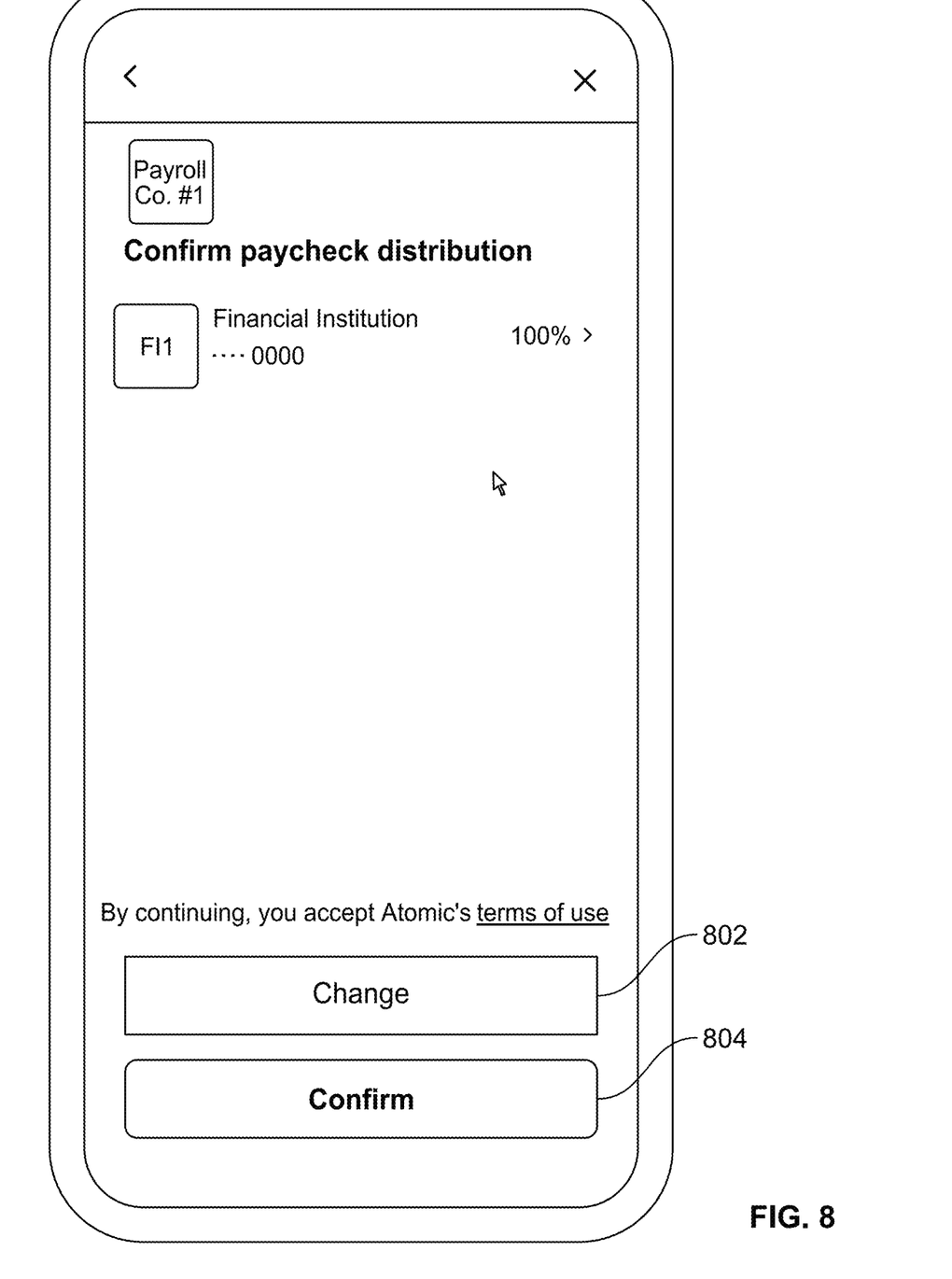
FIG. 8 is an example of a user interface displaying a task associated with a function to be performed in accordance with some embodiments.
Figure 9:
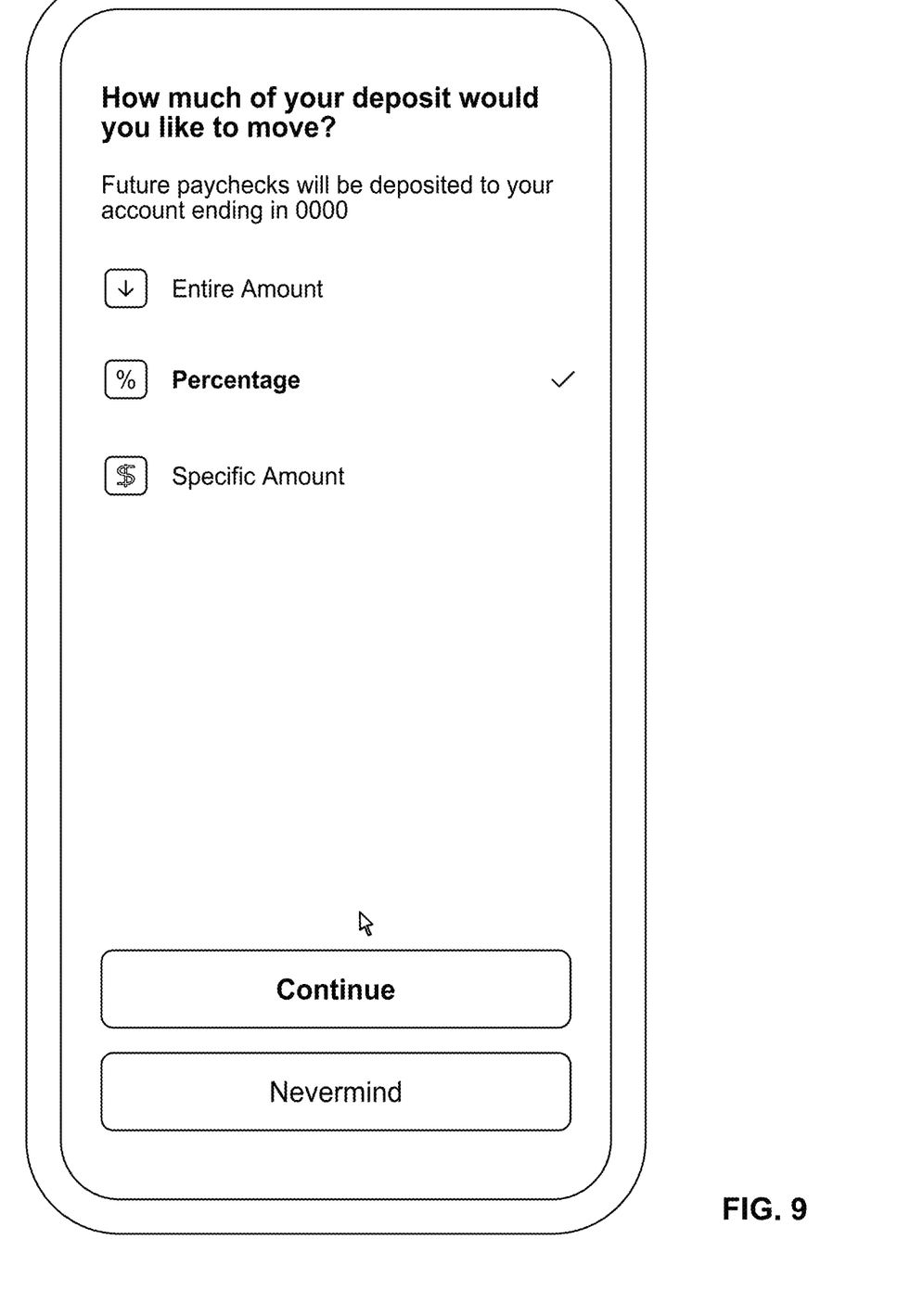
FIG. 9 is an example of a user interface to modify a field associated with a form in accordance with some embodiments.
Figure 10:
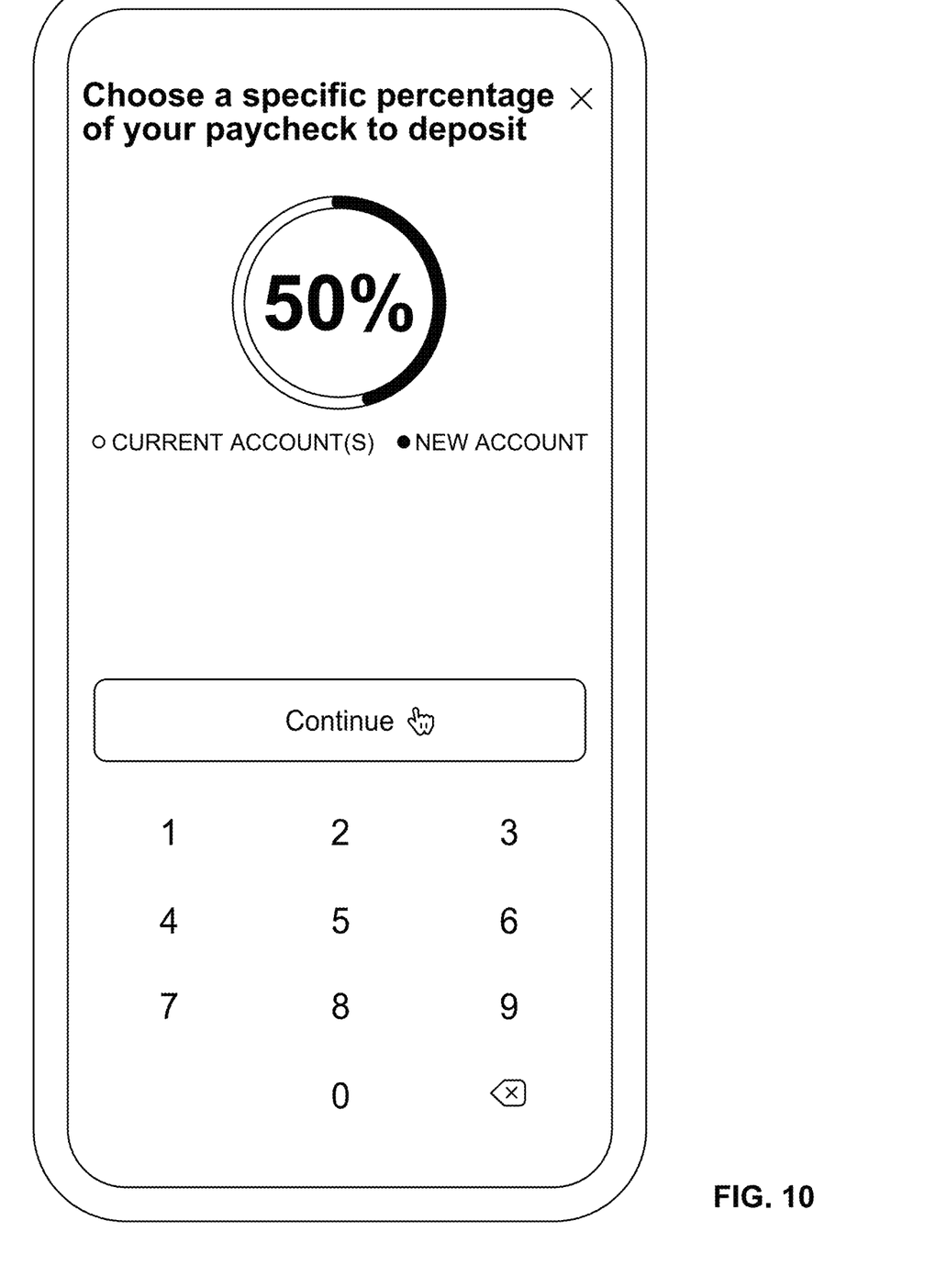
FIG. 10 is an example of a user interface to modify a field associated with a form in accordance with some embodiments.

In some embodiments, one or more fields associated with a form may be modified by user 101. For example, the amount or percentage of a paycheck that is to be deposited to a bank account may be modified by user 101. As seen in FIG. 8, the user interface indicates that 100% of the user's paycheck is to be deposited to financial institution "FI1." User 101 may select user interface item 802 to change the distribution or user interface item 804 to confirm the distribution. In response to a selection of user interface item 802, SDK 104 may provide, as seen in FIG. 9, an interface to change the distribution associated with the direct deposit. User 101 has the option to deposit the entire amount of a paycheck, a percentage of a paycheck, or a specific amount of a paycheck into an account associated with the entity. As seen in FIG. 10, user 101 has decided to change the distribution percentage from 100% to 50%.

In response to a selection of user interface item 804, SDK 104 is configured to automate one or more tasks needed to perform the requested function by providing one or more API requests (e.g., Fetch API requests) to third-party system 122. The API request is generated, in various embodiments, by initiating bidirectional communication using remote procedure calls (RPC) with backend server 112 via communication channel 110. The RPC indicates the requested function to be performed. Communication channel 110 may be a wired or wireless communications channel. Data may be communicated over communication channel 110 using the Internet, cellular, Wi-Fi, or any other communication protocol.

Based on the requested function indicated in the RPC, backend server 112 is configured to perform a lookup to determine one or more parameters associated with the requested function, an API request body for the requested function (e.g., information from the one or more pre-populated forms to be included in the API request), and a header for the API request corresponding to the requested function, and trigger the performance of the requested function (e.g., establishing direct deposit to financial institution FI1) via a RPC to SDK 104 with the determined parameter(s) associated with the requested function, the determined API request body for the requested function, and the determined header for the API request corresponding to the requested function. In some embodiments, the function comprises code that resides within SDK 104. In response to receiving the one or more parameters associated with the function, the API request body for the requested function, and the header for the API request corresponding to the requested function, SDK 104 causes the requested function to be performed by including in the one or more API requests to third party system 122, the received parameter(s), the received API request body for the requested function, and the received header. The browser associated with the webview natively attaches the token or other cookie (e.g., comprising a cookie and/or an authenticated session identifier contained in a cookie) to each API request.

In an alternative embodiment, a function may be triggered by passing code associated with the function and the one or more parameters associated with the function to SDK 104. However, latency associated with implementing the function is reduced by having the code associated with the function reside within SDK 104. As a result, backend server 112 is sending to SDK 104 a smaller set of data that includes the one or more parameters associated with the function. A disruption in communications may prevent the other systems from triggering the function due to the amount of data that needs to be transmitted from backend server 112 to user device 102. That is, the transmitted data includes the code associated with the function and the one or more parameters associated with the function. In contrast, by embedding the code associated with the function within SDK 04, the function may be implemented by user device 102 even if there is a poor communication channel 110 between user device 102 and backend server 112 because a smaller set of data is transmitted from backend server 112 to SDK 104 for the purposes of implementing the function.

After the requested function has been performed (e.g., direct deposit has been established between the payroll provider and a financial institution associated with the user), the user interface associated with SDK 104 returns to a user interface associated with application 103.

For each change or other interaction, application 103 or SDK 104 is configured to receive a response from third-party system 122. In some embodiments, application 103 or SDK 104 is configured to provide all or part of the response to a decision engine 114 associated with SDK 104 via a web socket connection 110 (i.e., a persistent real time connection). The decision engine 124 may run on a server, a container, a virtual machine, etc. The decision engine 114 may be located in a cloud environment (e.g., public or private cloud). Communications between SDK 104 and backend server 112 are encrypted (e.g., using private/public key pairs, elliptic curve cryptography, transport security layer, etc.). The decision engine 114 determines whether the response indicates that the requested change was approved by third-party system 122 (e.g., 200 response). For example, decision engine 114 may inspect the header and/or payload associated with the response. In response to determining that the requested change was approved by third-party system 122, decision engine 114 is configured to provide to application 103 or SDK 104 a notification that the change was approved. In response to determining that the requested change was not approved by the third-party system (e.g., the payroll provider), decision engine 112 provides to application 103 or SDK 104 a notification that the change was not approved.

The disclosed technique may ensure that financial and other information (e.g., global unique identifier (GUID)) is accurately communicated between application 103 and third-party system 122. In various embodiments, a provider of SDK 104 receives from the employee or their employer routing and account information of an entity associated with the employee. The routing and account information may be manually entered into a form that is displayed to the user, which may include data entry errors. Using the disclosed technique, the routing and account information is provided by the entity through application 103. The routing and account information is stored and used by SDK 104, in various embodiments, to facilitate techniques as disclosed herein. For example, SDK 104 may provide the routing and account information to third-party system 122, eliminating the need for the user to enter that information again, such as to manually enter the information in a form or page provided by the third-party system. For example, SDK 104 may store routing number and account number information for a bank account of user 101 at a bank with which application 103 is associated. To make a change with respect to third-party system 122—e.g., to establish a new direct deposit to the bank account-SDK 104 may retrieve the previously stored routing and account information, rather than requiring the user to enter the information again.

In various embodiments, browser automation may be used to implement the technique disclosed herein. For example, browser automation may be used to provide a "headless" instance of a mobile device browser that can be controlled, e.g., to send the API calls described above, by SDK 104 and/or associated code. In various embodiments, the browser automation techniques may be akin to Puppeteer™ or other tools used to provide browser automation on desktop browsers. However, Puppeteer™ is not designed to run inside a native mobile SDK.

The disclosed technique may be used to ensure that employment-related information is communicated between application 103 and a third-party system associated with a payroll provider. A user may request a loan (e.g., mortgage, car loan, etc.) from the entity associated with application 103. The entity may require the user to provide documents (e.g., documentation of employment, one or more previous years of W-2 statements, one or more paystubs, etc.) before the entity will approve the loan. Application 103 may utilize an API request generated by SDK 104 that requests the documents from a system associated with the selected payroll provider. In response to receiving the request, the system associated with the selected payroll provider may obtain the requested documents and provide them directly to application 103. This prevents the user from inadvertently omitting the documents, or doctoring the documents and providing fraudulent loan documents.

In some embodiments, a user authenticates with an insurance provider (auto, home, life, etc.) using the disclosed technique. SDK 104 is configured to receive from third-party system 122 a comparison comparing an insurance plan associated with user 101 with one or more other insurance plans. App 103 associated with an insurance company may utilize SDK 104 and the authenticated session to electronically sign an insurance plan. In some embodiments, the insurance plan is a new insurance plan. In some embodiments, the insurance plan is a current insurance plan.

Figure 2:
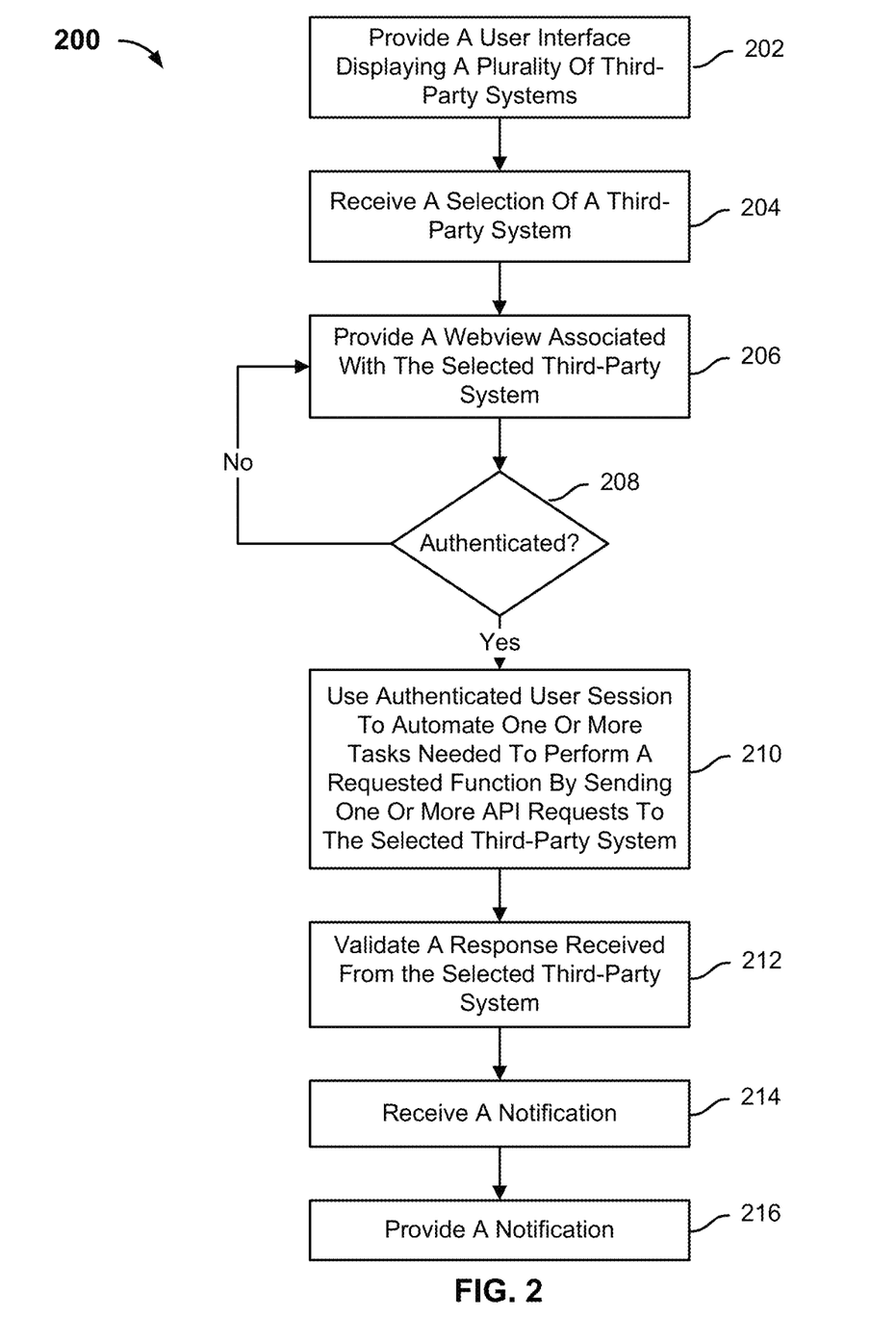
FIG. 2 is a flow diagram illustrating an embodiment of a process to securely communicate data between an application associated with an entity and a third-party system.

FIG. 2 is a flow diagram illustrating an embodiment of a process to securely communicate data between an application associated with an entity and a third-party business system, such as a system associated with a payroll provider. In the example shown, process 200 may be implemented by an application, such as application 103 and/or an SDK incorporated in such an application, e.g., SDK 104.

At 202, a user interface displaying a plurality of third-party systems is provided. A user may open an application associated with an entity (e.g., a financial institution, a financial technology company, a financial service organization, a benefit provider, an institution, an enterprise, a government, a business, a corporation, etc.) on their user device (e.g., mobile device, cell phone, smart phone, tablet, laptop, desktop, server, smart watch, IoT device, etc.). The user may desire to access a third-party system to perform one or more functions (e.g., establish a direct deposit, change a direct deposit, establish a recurring payment, manage a recurring payment, apply for a mortgage, apply for a loan, apply for a job, file an insurance claim, purchase a product or service, electronically sign a document, etc.).

The application is configured to receive a request to perform a function with respect to a third-party system associated with the user. Based on the requested function, the application invokes code associated with an SDK, which provides access via a user interface to a plurality of third-party systems associated with the requested function. A third-party system may be a computing device associated with human resources, accounting, billing, ticketing, customer relationship management, applicant tracking system, insurance, legal, job recruiting, medical provider, or any other third-party system that has an associated login page or authentication portal.

At 204, a selection of a third-party system is received. A user interface associated with a user device may receive the selection in the form of an input from the user.

At 206, a webview associated with the selected third-party system is provided. The webview associated with the selected third-party system is a native login page associated with the selected third-party system. The SDK is configured to cause the application to communicate with the selected third-party system and obtain the native login page associated with the selected third-party system. Providing a webview of the native login page associated with the selected third-party system removes the need to provide the user's login credentials to an intermediary service because the user's login credentials are directly provided from the application, via the webview, to the selected third-party system. The user's login credentials are more secure because there is one fewer access point from which a malicious actor may obtain the user's login credentials.

Other systems may implement an intermediary service that uses a virtual device running inside of a cloud environment to provide a mock login page that looks like a native login page associated with the selected third-party system. This requires the selected third-party system to communicate with the virtual device, which then communicates with the application. Embedding an SDK within the application removes the need for the virtual device to communicate with the selected third-party system and thus reduces the latency associated with communications between the application and the selected third-party system.

In some embodiments, the user enters their login credentials into the webview of the native login page associated with a selected third-party system via a password manager. This may reduce the amount of time needed to log into third-party system and increase the likelihood that the entered login credentials are correct. As mentioned above, other systems may display a login page that looks like a native login page associated with the selected third-party system. However, this poses a problem because the password manager is configured to inspect the domain associated with the displayed login page. A password manager may not be able to accurately determine which credentials, if any, to enter in a mock login page that looks like a native login page associated with the selected third-party system because the domain associated with the mock login page that looks like the native login page associated with the selected third-party system does not match the domain associated with the selected third-party system. In various embodiments, providing a native webview of a login page associated with the third-party system, as disclosed herein, enables a password manager to correctly enter the login credentials on behalf of user.

At 208, it is determined whether a user has been authenticated. The SDK may inspect the DOM associated with the native login page or other page associated with the selected third-party system. The SDK may use one or both of the visual elements associated with a page and a URL associated with the page to determine the state of the user's authentication status. For example, the page may include a "sign out" text or other visual element, which indicates the user has been authenticated. In some embodiments, machine learning is implemented (e.g., supervised, unsupervised, reinforcement) to determine that the selected third-party system has authenticated the user. For example, machine learning may be implemented to analyze the visual elements associated with the page.

In response to a determination that the user has been authenticated, process 200 proceeds to step 210. In response to a determination that the user has not (yet) been authenticated, process 200 returns to step 206. In some embodiments, error handling may be invoked if the user is not determined, e.g., within a prescribed time, to have authenticated successfully.

At 210, the authenticated user session is used to automate one or more tasks needed to perform the requested function by sending one or more API requests to the selected third-party system. In some embodiments, the requested function is performed by providing one or more pre-populated forms to the third-party system. In some embodiments, one or more fields associated with a form may be modified by a user. The SDK provides a user interface that indicates the function to be performed and a user interface item that causes the function to be performed. In response to a selection of the user interface item, the SDK generates one or more API requests.

The API request is generated by initiating an RPC with a backend server associated with the SDK. The RPC indicates the requested function to be performed. Based on the requested function indicated in the RPC, the backend server associated with the SDK performs a lookup to determine one or more parameters associated with the requested function, an API request body for the requested function (e.g., information from the one or more pre-populated forms to be included in the API request), and a header for the API request corresponding to the requested function, and triggers the performance of the requested function via a RPC to the SDK with the determined parameter(s) associated with the requested function, the determined API request body for the requested function, and the determined header for the API request corresponding to the requested function. In response to receiving the one or more parameters associated with the function, the API request body for the requested function, and the header for the API request corresponding to the requested function, the SDK causes the requested function to be performed by including in the one or more API requests to the third party system, the received parameter(s), the received API request body for the requested function, and the received header.

The webview associated with the application natively attaches, to each API request, the token or other cookie (e.g., comprising a cookie and/or an authenticated session identifier contained in a cookie) that was received by the user's device after the user was authenticated, thus providing the third-party system an indication that the API request is a trusted request because the token has been previously signed and authenticated by the third-party system.

At 212, a response received from the selected third-party system is validated. For each API request, the SDK receives a response from the selected third-party system. The SDK provides the response to a decision engine associated with the SDK via a web socket connection (i.e., a persistent real time connection). Communications between the SDK and the decision engine are encrypted (e.g., private/public key pairs, elliptic curve cryptography, etc.). The decision engine determines whether the response (e.g., 200 response) indicates that the requested function was performed (e.g., direct deposit approved) by the selected third-party system. For example, the decision engine may inspect the header and/or payload associated with the response and conclude they are consistent with a successful interaction.

At 214, a notification is received. In response to determining that the API requested was approved by the selected third-party system, the decision engine provides to the SDK a notification that the change was approved. In response to determining that the API request was not approved by the selected third-party system, the decision engine provides to the SDK a notification that the change was not approved.

At 216, a notification is provided. The notification indicates that the requested function has been completed (e.g., direct deposit has been established between the payroll provider and a financial institution associated with the user). After the requested function has been completed, the user interface associated with the SDK returns to a user interface associated with the application.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
    a communication interface; and
    a processor, coupled to the communication interface, configured to:
        provide, by code associated with a second entity in an application context of an application corresponding to a first entity associated with a user, a webview associated with a third-party system selected from a plurality of third-party systems, wherein the webview associated with the selected third-party system displays a native login page corresponding to the selected third-party system, wherein the user's login credentials are directly provided from the application associated with the application context, via the webview associated with the selected third-party system, to the selected third-party system;
        determine by executing the code associated with the second entity that the user has been authenticated by the selected third-party system, using data comprising response page displayed via the provided webview associated with the selected third-party system by determining that the data comprising the response page includes data indicative of the user being authenticated, wherein the code associated with the second entity is embedded in code of the application corresponding to the first entity associated with the user; and
        in response to the determination that the data comprising the response page includes data indicative of the user being authenticated, automate one or more tasks needed to perform a function, requested by the user, with the selected third-party system on behalf of the entity, including by executing further code associated with the second entity to communicate with a backend server that determines a parameter and a request structure associated with the function requested by the user as implemented by the selected third-party system and use the parameter and the request structure to generate and send to the selected third-party system an application programming interface request that includes the parameter and conforms to the request structure.

2. The system of claim 1, wherein the processor is configured to provide, via a user interface, the plurality of third-party systems.

3. The system of claim 2, wherein the processor is configured to receive, via the user interface, the selection of the third-party system selected from the plurality of third-party systems.

4. The system of claim 3, wherein the processor is configured to obtain from the selected third-party system the native login page associated with the selected third-party system.

5. The system of claim 3, wherein the user's login credentials are not accessed by code associated with the second entity.

6. The system of claim 3, wherein the user's login credentials are entered into the native login page associated with the selected third-party system via a password manager.

7. The system of claim 1, wherein the data comprising or otherwise associated with the response page includes a uniform resource locator.

8. The system of claim 1, wherein the data comprising or otherwise associated with the response page is analyzed using machine learning.

9. The system of claim 1, wherein the request comprises the application programming interface request.

10. The system of claim 1, wherein the processor is configured to perform the function with the third-party system by initiating bidirectional communication via remote procedure calls with the backend server.

11. The system of claim 10, wherein the backend server is associated with the second entity.

12. The system of claim 10, wherein in response to the remote procedure call, the backend server is configured to provide one or more parameters associated with the function.

13. The system of claim 12, wherein in response to receiving the one or more parameters associated with the function via the remote procedure call, the processor is configured to perform the function with the third-party system using the one or more parameters as values.

14. The system of claim 10, wherein data transferred in the remote procedure call with the backend server is encrypted using elliptic curve cryptography.

15. The system of claim 1, wherein the request structure includes an application programming interface request body and a header that the backend server determined as the request structure associated with the function requested by the user.

16. A method, comprising:
providing, by code associated with a second entity in an application context of an application corresponding to a first entity associated with a user, a webview associated with a third-party system selected from a plurality of third-party systems, wherein the webview associated with the selected third-party system displays a native login page corresponding to the selected third-party system, wherein the user's login credentials are directly provided from the application associated with the application context, via the webview associated with the selected third-party system, to the selected third-party system;
determining, by executing the code associated with the second entity, that the user has been authenticated by the selected third-party system, using data comprising a response page displayed via the provided webview associated with the selected third-party system by determining that the data comprising the response page includes data indicative of the user being authenticated, wherein the code associated with the second entity is embedded in code of the application corresponding to the first entity associated with the user; and
in response to determining that the data comprising the response page includes data indicative of the user being authenticated, automating one or more tasks needed to perform a function, requested by the user, with the selected third-party system on behalf of the entity, including by executing further code associated with the second entity to communicate with a backend server that determines a parameter and a request structure associated with the function requested by the user as implemented by the selected third-party system and use the parameter and the request structure to generate and send to the selected third-party system an application programming interface request that includes the parameter and conforms to the request structure.

17. The method of claim 16, wherein one of the one or more visual elements is a uniform resource locator.

18. The method of claim 16, wherein one of the one or more visual elements is a visual text.

19. The method of claim 16, wherein performing the function associated with the selected third-party system includes initiating a remote procedure call with the backend server.

20. A computer program product embodied in a non-transitory computer readable medium and comprising computer instructions for:
providing, by code associated with a second entity in an application context of an application corresponding to a first entity associated with a user, a webview associated with a third-party system selected from a plurality of third-party systems, wherein the webview associated with the selected third-party system displays a native login page corresponding to the selected third-party system, wherein the user's login credentials are directly provided from the application associated with the application context, via the webview associated with the selected third-party system, to the selected third-party system;
determining, by executing the code associated with the second entity, that the user has been authenticated by the selected third-party system, using data comprising a response page displayed via the provided webview associated with the selected third-party system by determining that the data comprising the response page includes data indicative of the user being authenticated, wherein the code associated with the second entity is embedded in code of the application corresponding to the first entity associated with the user; and
in response to determining that the data comprising the response page includes data indicative of the user being authenticated, automating one or more tasks needed to perform a function, requested by the user, with the selected third-party system on behalf of the entity, including by executing further code associated with the second entity to communicate with a backend server that determines a parameter and a request structure associated with the function requested by the user as implemented by the selected third-party system and use the parameter and the request structure to generate and send to the selected third-party system an application programming interface request that includes the parameter and conforms to the request structure.

* * * * *